US011494977B2

(12) United States Patent
Shafer

(10) Patent No.: US 11,494,977 B2
(45) Date of Patent: Nov. 8, 2022

(54) AUTOMATED PROCESS FOR BUILDING MATERIAL DETECTION IN REMOTELY SENSED IMAGERY

(71) Applicant: Maxar Intelligence Inc., Westminster, CO (US)

(72) Inventor: Jeffrey D. Shafer, Westminster, CO (US)

(73) Assignee: Maxar Intelligence Inc., Westminster, CO (US)

( * ) Notice: Subject to any disclaimer, the term of this patent is extended or adjusted under 35 U.S.C. 154(b) by 190 days.

(21) Appl. No.: 16/805,461

(22) Filed: Feb. 28, 2020

(65) Prior Publication Data

US 2021/0272357 A1 Sep. 2, 2021

(51) Int. Cl.
*G06K 9/36* (2006.01)
*G06K 9/48* (2006.01)
*G06T 17/05* (2011.01)

(52) U.S. Cl.
CPC .... *G06T 17/05* (2013.01); *G06T 2207/10032* (2013.01)

(58) Field of Classification Search
CPC ................................ G06K 9/3216; G06T 7/70
See application file for complete search history.

(56) References Cited

U.S. PATENT DOCUMENTS

| | | | | | |
|---|---|---|---|---|---|
| 6,816,819 | B1 * | 11/2004 | Loveland | ............... | G06Q 10/06 703/1 |
| 7,746,343 | B1 * | 6/2010 | Charaniya | ........... | G06F 16/2425 345/428 |
| 10,255,302 | B1 * | 4/2019 | Cosic | .................... | G06F 16/252 |
| 11,151,378 | B2 * | 10/2021 | Kottenstette | ........... | G06K 9/627 |
| 2004/0054475 | A1 * | 3/2004 | Grace | ..................... | G06T 17/20 702/1 |

(Continued)

OTHER PUBLICATIONS

Ieiden et al., "Urban Structure Type Characterization Using Hyperspectral Remote Sensing and Height Information", Landscape and Urban Planning, vol. 105, Issue 4, Apr. 30, 2012, pp. 361-375, AAPA furnished via IDS.*

(Continued)

Primary Examiner — Guillermo M Rivera-Martinez
(74) Attorney, Agent, or Firm — Vierra Magen Marcus LLP

(57) ABSTRACT

A system and method for automatically (without human intervention) identifying a material in an image that comprises a building material for buildings in the image. Building side polygons which may be used to identify building sides in off-nadir imagery are generated. Off-nadir, multispectral images, building footprint data and elevation data for a geographic area are taken as input. Building heights for buildings in the geographic area are determined by clipping the elevation data using the building footprint data and then calculating building heights. A candidate set of polygons representing visible side faces of each building in the images (Continued)

is created from the known building heights, and based on the viewpoint direction, using vector analysis. After culling occluded polygons and polygons too small for analysis, the polygons are associated with a building footprint. Building materials for each building having visible polygons can then be identified.

20 Claims, 9 Drawing Sheets

(56) References Cited

U.S. PATENT DOCUMENTS

| | | | | |
|---|---|---|---|---|
| 2005/0001814 A1* | 1/2005 | Anton | ............... | G06F 3/0346 345/158 |
| 2006/0164417 A1* | 7/2006 | Donovan | ............... | G06T 17/05 345/428 |
| 2007/0036467 A1* | 2/2007 | Coleman | ............... | G06T 3/4061 382/294 |
| 2009/0208095 A1* | 8/2009 | Zebedin | ............... | G06T 17/05 382/154 |
| 2013/0300740 A1* | 11/2013 | Snyder | ............... | G06F 3/016 345/420 |
| 2014/0133741 A1* | 5/2014 | Wang | ............... | G06T 7/543 382/154 |
| 2014/0212029 A1* | 7/2014 | Rohlf | ............... | G06F 16/29 382/154 |
| 2016/0037357 A1* | 2/2016 | Barbosa Da Torre | ............... | H04W 16/18 455/446 |
| 2017/0235018 A1* | 8/2017 | Foster | ............... | G06F 16/5866 702/5 |
| 2017/0236024 A1* | 8/2017 | Wang | ............... | G06K 9/6221 382/201 |
| 2018/0025541 A1* | 1/2018 | Xie | ............... | G06T 7/62 345/420 |

OTHER PUBLICATIONS

Izadi et al., "Three-Dimensional Polygonal Building Model Estimation from Single Satellite Images", IEEE ransactions on Geoscience and Remote Sensing, vol. 50, Issue 6, Jun. 2012, pp. 2254-2272, AAPA furnished via IDS.*

International Search Report and Written Opinion dated May 31, 2021, International Application No. PCT/US2021/019742.

Heiden, Uta et al., "Urban Structure Type Characterization Using Hyperspectral Remote Sensing and Height Information", Landscape and Urban Planning, vol. 105, Issue 4, Apr. 30, 2012, pp. 361-375.

Izadi, Mohammad et al., "Three-Dimensional Polygonal Building Model Estimation from Single Satellite Images", IEEE Transactions on Geoscience and Remote Sensing, vol. 50, Issue 6, Jun. 2012, pp. 2254-2272.

Lin, Chungan et al., "Building Detection and Description from a Single Intensity Image", Computer Vision and Image Understanding, vol. 72, Issue 2, Nov. 1998, pp. 101-121.

Ok, Ali Ozgun "Automated Detection of Buildings from Single VHR Multispectral Images Using Shadow Information and Graph Cuts", ISPRS Journal of Photogrammetry and Remote Sensing, vol. 86, Dec. 2013, pp. 21-40.

Shanmugam, S., et al., "Spectral Matching Approaches in Hyperspectral Image Processing", International Journal of Remote Sensing, vol. 35, Issue 24, Dec. 20, 2014, pp. 8217-8251.

International Preliminary Report on Patentability dated Sep. 9, 2022, International Application No. PCT/US2021/019742.

* cited by examiner

AUTOMATED PROCESS FOR BUILDING MATERIAL DETECTION IN REMOTELY SENSED IMAGERY

BACKGROUND

The use of geospatial imagery (e.g., satellite imagery) has continued to increase. As such, high quality geospatial imagery has become increasingly valuable. For example, a variety of different entities (e.g., government entities, corporations, universities, individuals, or others) may utilize satellite imagery. As may be appreciated, the use of such satellite imagery may vary widely such that satellite images may be used for a variety of differing purposes.

Many entities utilize geospatial imagery in order to learn about objects such as buildings on the Earth. For example, an entity may want to know about the presence or absence of materials in a building. However, due to the large number of images available and the large amount of data, it is often not practical for a human to manually review geospatial imagery. Therefore, systems have been developed to automate the detection of materials in images, including using machine learning to identify materials in images.

One problem with automating the identification of materials in images is that the position and orientation of geospatial imagery affects what portions of physical objects in the image are visible and what portions are obscured in the image. In practice, collecting an image at nadir, i.e., looking straight down at the target, does not occur with high-resolution satellite imagery; satellite sensors always shoot at an angle. As such, portions of buildings in geospatial imagery will be occluded based on the viewing position of the satellite.

DETAILED DESCRIPTION

Technology is proposed for automatically (without human intervention) identifying a material in an image (e.g., an image captured at a satellite or other airborne craft) that comprises a building material for buildings in the images. The technology generates building side polygons which may be used to identify building sides in off-nadir imagery. The technology takes as input the off-nadir, multispectral images for a geographic area, as well as building footprint data and elevation data for the geographic area. Building heights are determined by clipping the elevation data using the building footprint data to calculate building heights. A candidate set of polygons representing visible side faces of each building in the images is created from the known building heights, and based on the viewpoint direction, using vector analysis. After culling occluded polygons and polygons too small for analysis, the polygons are associated with a building footprint. The resulting data may then be used for any desired purpose. In one aspect, the data is used to identify specific image pixels associated with buildings to perform building material identification and classification.

Figure 1:
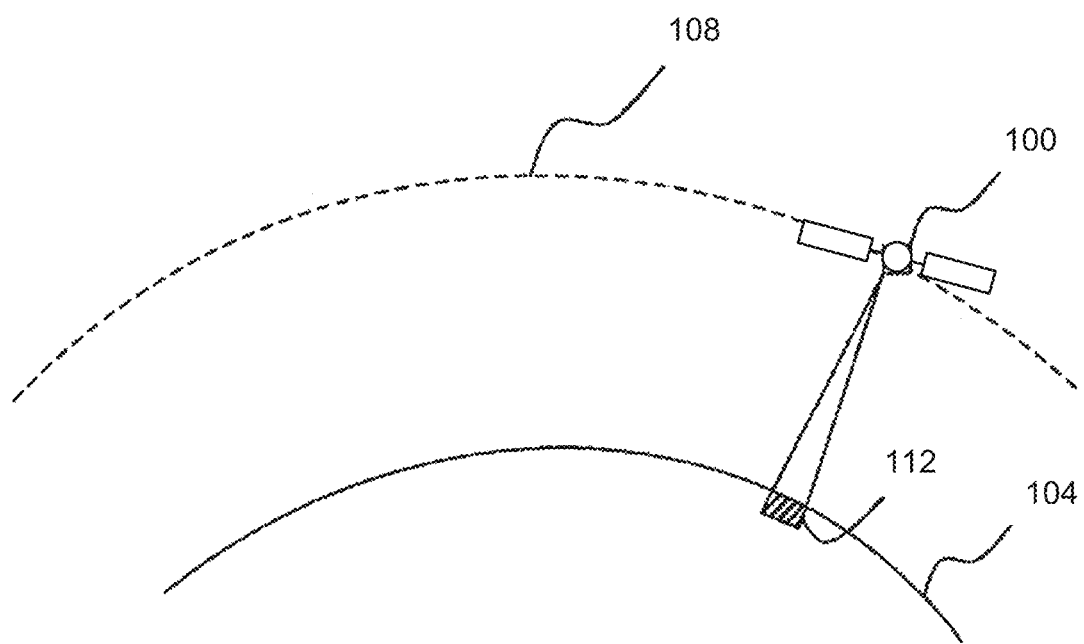
FIG. 1 illustrates how a satellite orbiting a planet can be used to obtain images of the Earth. This satellite can be used as part of an image collection and distribution system that can implement various embodiments of the proposed technology.

FIG. 1 depicts a satellite 100 orbiting a planet 104 (e.g., Earth, another planet or another object). Satellite 100 can be used to capture the images analyzed using the technology proposed herein. At the outset, it is noted that, when referring to the Earth herein, reference is made to any body or object of which it may be desirable to acquire images or other remote sensing information. Furthermore, when referring to a satellite herein, reference is made to any spacecraft, satellite, aircraft and/or other airborne craft capable of acquiring images. Furthermore, the system described herein may also be applied to other imaging systems, including imaging systems located on the Earth or in space that acquire images of other celestial bodies or objects. It is also noted that none of the drawing figures contained herein are drawn to scale, and that such figures are for the purposes of discussion and illustration only.

As illustrated in FIG. 1, satellite 100 orbits the Earth 104 following an orbital path 108. An imaging system aboard the satellite 100 is capable of acquiring an image of a portion 112 of the surface of the Earth 104, which portion 112 can also be referred to as a geographic region (or region). An image that is obtained by the satellite 100 includes a plurality of pixels. Furthermore, the satellite 100 may collect images in a number of spectral bands. In certain embodiments, the imaging system aboard the satellite 100 collects multiple bands of electromagnetic energy, wherein each band is collected by a separate image sensor element that is adapted to collect electromagnetic radiation within a corresponding spectral range. More specifically, an image obtained by the imaging system aboard the satellite 100 can be a multispectral image (MSI) where image data is captured at specific wavelength bands across the electromagnetic spectrum. That is, one or more image sensors (e.g., provided on a satellite imaging system) may have a plurality of specifically designed sensor elements capable of detecting light within a predetermined range of wavelengths.

For a specific example, the WorldView-2 low Earth orbiting satellite operated by DigitalGlobe, Inc. (which is part of Maxar Technologies Inc. of Westminster, Colo.), collects image data in eight visible and near infrared (VNIR) spectral bands, including, for example, a coastal (C) band (400-450 nm), a blue (B) band (450-510 nm), a green (G) band (510-580 nm), a yellow (Y) band (585-625 nm), a red (R) band (630-690 nm), a red edge (RE) band (705-745 nm), a near-infrared 1 (N1) band (770-895 nm), and a near-infrared 2 (N2) band (860-1040 nm). For another example, the WorldView-3 low Earth orbiting satellite operated by DigitalGlobe, Inc., in addition to collecting image data in the eight VNIR spectral bands mentioned above (i.e., the C, B, G, Y, R, RE, N1, and N2 bands), also includes sensors to obtain image data in an additional eight spectral bands that are in the short-wavelength infrared range (SWIR). Such SWIR bands may include, for example, SWIR 1 (1195-1225 nm), SWIR 2 (1550-1590 nm), SWIR 3 (1640-1680 nm), SWIR 4 (1710-1750 nm), SWIR 5 (2145-2185 nm), SWIR 6 (2185-2225 nm), SWIR 7 (2235-2285 nm), and/or SWIR 8 (2295-2365 nm). Other combinations and/or ranges of SWIR bands generally from about 1195 nm to about 2400 nm may be provided in any combination.

In some embodiments, band definitions broader and/or narrower than those described above may be provided without limitation. In any regard, there may be a plurality of band values corresponding to gray level values for each band for each given pixel in a portion of multispectral image data. There may also be a panchromatic sensor capable of detecting black and white imagery (also referred to as a panchromatic band) in the wavelength band of 450-800 nm. Further, the image data obtained by a satellite imaging system may include metadata that includes supplementary data regarding the acquisition of the image. For instance, image metadata that may accompany and/or form a portion of the image data may include satellite parameters (e.g., off nadir satellite angles, satellite attitudes, solar elevation angles, etc.), time/date of acquisition, and/or other appropriate parameters may be attributed to the metadata of an image.

Figure 2:
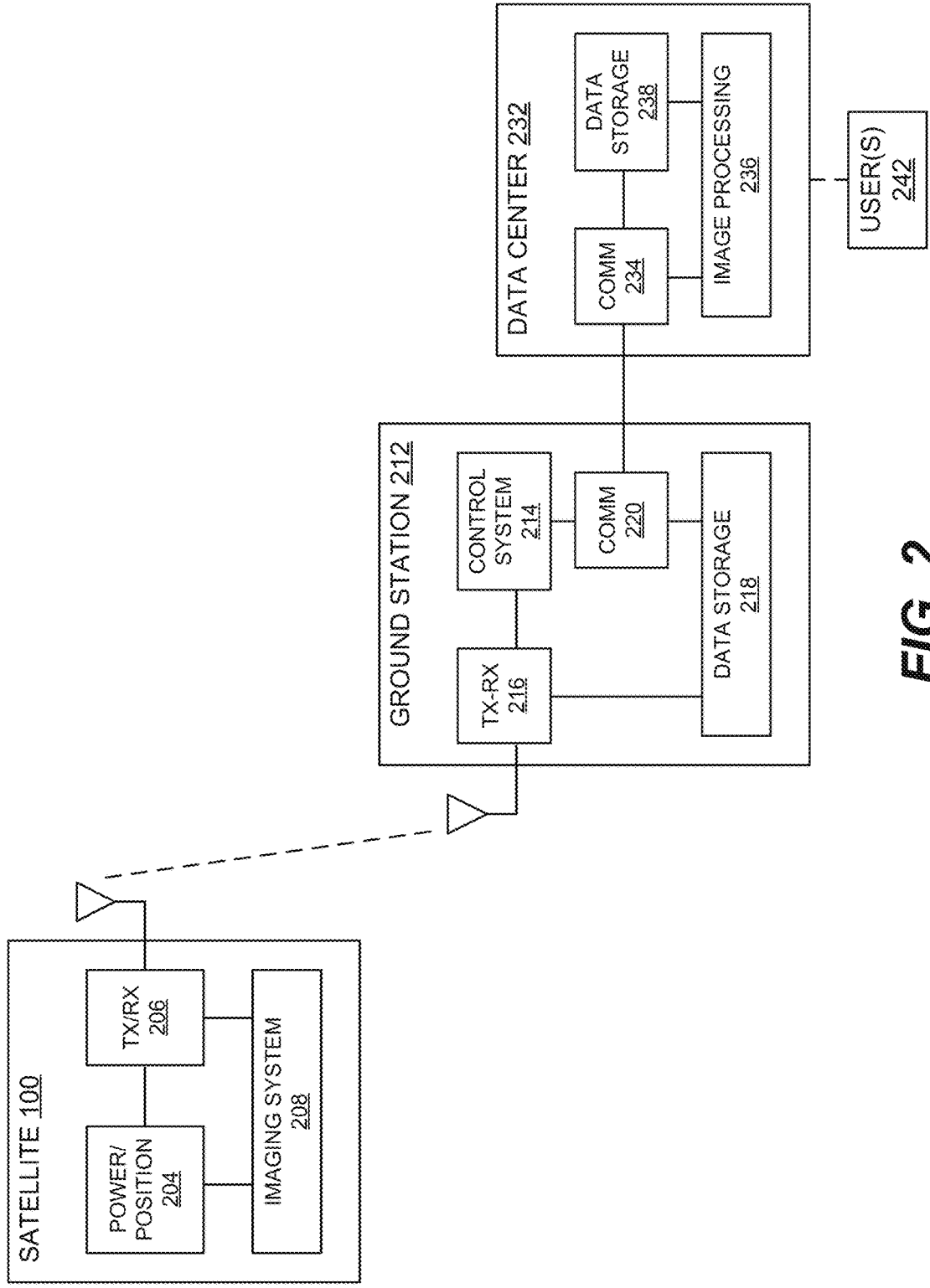
FIG. 2 is a high-level block diagram of an image collection and distribution system that can implement various embodiments of the proposed technology.

Referring now to FIG. 2, a block diagram representation of an image collection and distribution system 200 is shown therein. In this embodiment, the satellite 100 includes a number of subsystems, including power/positioning subsystem 204, a transmit/receive subsystem 206, and an imaging subsystem 208. Each of the aforementioned subsystems can also be referred to more succinctly as a system, e.g., the imaging subsystem 208 can also be referred to as the imaging system 208. The power/positioning subsystem 204 receives power and can be used to position that satellite 100 and/or the imaging system 208 to collect desired images, as is well known in the art. The TX/RX subsystem 206 can be used to transmit and receive data to/from a ground location and/or other satellite systems, as is well known in the art. The imaging system 208, in certain embodiments, includes one or more multispectral (MS) sensor arrays that collect electromagnetic energy within multiple (e.g., 4, 8, or 16) bands of electromagnetic energy, wherein a band of electromagnetic energy can also be referred to as a range of frequencies. In other words, each of the sensors collects electromagnetic energy falling within a respective preset band that is received at the sensor. Examples of such bands were discussed above. The imaging sensors, which can also be referred to as image sensors, can include charge coupled device (CCD) arrays and associated optics to collect electromagnetic energy and focus the energy at the CCD arrays. The CCD arrays can be configured to collect energy from a specific energy band by a mass of optical filters. The sensors can also include electronics to sample the CCD arrays and output a digital number (DN) that is proportional to the amount of energy collected at the CCD array. Each CCD array includes a number of pixels, and in accordance with certain embodiments, the imaging system operates as a push broom imaging system. Thus, a plurality of DNs for each pixel can be output from the imaging system to the transmit/receive system 206. The use of other types of sensors, besides a CCD array, is also possible and within the scope of the embodiments described herein. For a nonlimiting example, an alternative type of sensor that can be used in place of CCD type sensors is complementary metal-oxide-semiconductor (CMOS) type sensors.

The satellite 100 transmits to and receives data from a ground station 212. In one embodiment, ground station 212 includes a transmit/receive system 216, a data storage system 218, a control system 214, and a communication system 220, each of which can also be referred to as a subsystem. While only one ground station 212 is shown in FIG. 2, it is likely that multiple ground stations 212 exist and are able to communicate with the satellite 100 throughout different portions of the satellite's orbit. The transmit/receive system 216 is used to send and receive data to and from the satellite 100. The data storage system 218 may be used to store image data collected by the imaging system 208 and sent from the satellite 100 to the ground station 212. The control system 214 can be used for satellite control and can transmit/receive control information through the transmit/receive system 216 to/from the satellite 100. The communication system 220 is used for communications between the ground station 212 and one or more data centers 232.

Data center 232 includes a communication system 234, a data storage system 238, and an image processing system 236, each of which can also be referred to as a subsystem. The image processing system 236 processes the data from the imaging system 208 and provides a digital image to one or more user(s) 242. Certain operations of the image processing system 236, according to certain embodiments of the proposed technology, will be described in greater detail below. That is, in some embodiments, the processes discussed below for identifying a material in an image are performed by image processing system 236. Alternatively, the image data received from the satellite 100 at the ground station 212 may be sent from the ground station 212 to a user 242 directly. The image data may be processed by the user (e.g., a computer system operated by the user) using one or more techniques described herein to accommodate the user's needs.

Figure 3A:
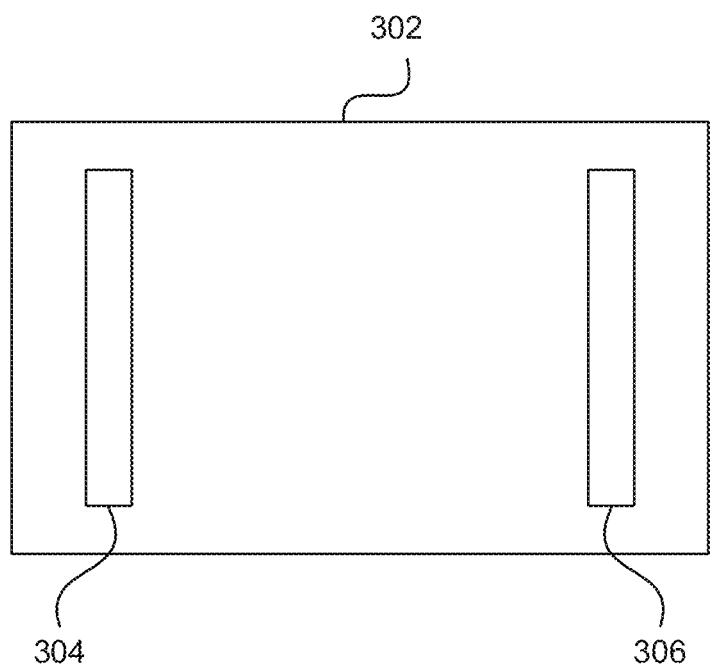
FIG. 3A illustrates an exemplary top view of a sensor assembly that can be carried by a satellite.
Figure 3B:
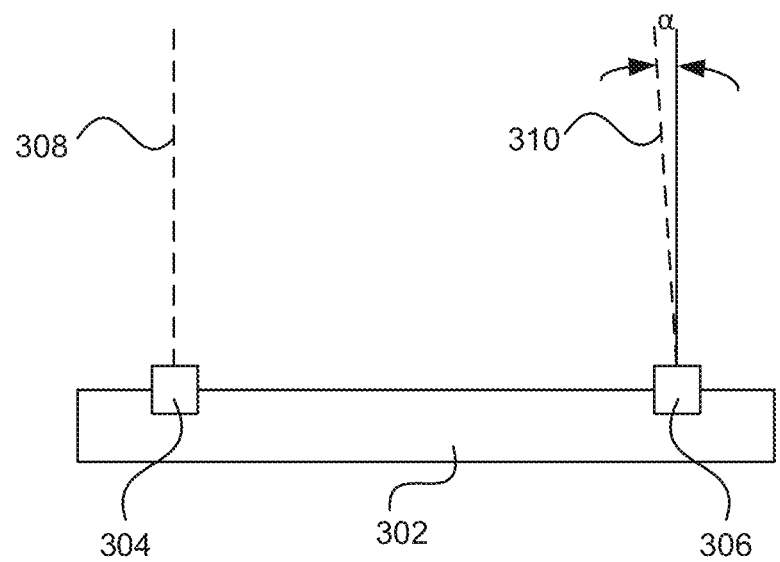
FIG. 3B illustrates an exemplary side view of the sensor assembly of FIG. 3A.

FIG. 3A illustrates an exemplary top view of a sensor assembly 302 of the imaging system 208 that can be carried by the satellite 100, and FIG. 3B illustrates an exemplary side view of the sensor assembly 302. More specifically referring to FIGS. 3A and 3B, the imaging system 208 can include first and second multispectral (MS) sensor arrays 304 and 306, which can also be referred to as the MS1 sensor 304 and the MS2 sensor 306. The MS1 sensor 304 and the MS2 sensor 306 can be considered parts of the sensor assembly 302 that is carried by the satellite 100. Each of the MS1 and MS2 sensors 304, 306 can include thousands of image sensor elements generally aligned in one or more rows arranged generally perpendicular to the flight direction of the satellite 100, thereby enabling images to be captured one or more rows at a time, as is done in a push broom imaging system.

In one embodiment, the MS1 sensor 304 includes one or more rows of image sensor elements that collect image data in the blue (B) band (450-510 nm), green (G) band (510-580 nm), red (R) band (630-690 nm), and near-infrared 1 (N1) band (770-895 nm); and the MS2 sensor 306 includes one or more rows of image sensor elements that collect image data in the coastal blue (C) band (400-450 nm), yellow (Y) band (585-625 nm), red edge (RE) band (705-745 nm), and near-infrared 2 (N2) band (860-1040 nm). In other words, the MS1 sensor 304 collects image data in the B, G, R, and N1 bands; and the MS2 sensor 306 collects image data in the C, Y, RE, and N2 bands. Together, the MS1 and MS2 sensors 304, 306 collect or capture image data in the VNIR bands.

As can be appreciated from FIGS. 3A and 3B, the MS1 sensor 304 and the MS2 sensor 306 are physically spaced apart from one another. That is, the MS1 sensor 304 and the MS2 sensor 306 are at different positions on the focal plane of satellite 100. Referring to FIGS. 3A and 3B, the MS1 sensor 304 is designed together with an optical system of the satellite to receive radiant optical energy along a first primary axis 308, and the MS2 sensor 306 is designed together with the optical system of the satellite to receive radiant optical energy along a second primary axis 310, wherein an angle α between the first and second primary axes 306, 308 can also be referred to as a parallax angle α. The parallax angle α, which specifies the angular offset between the primary axes 308, 310, can be in the range of 0.05 degrees to 5 degrees, and in specific embodiments, is about 0.16 degrees, but is not limited thereto. As will be appreciated from the discussion below, certain embodiments of the present technology exploit the fact that the MS1 sensor 304 and the MS2 sensor 306 are physically and angularly offset from one another.

In one embodiment, both the MS1 sensor 304 and the MS2 sensor 306 are push broom sensors. There is a physical separation between the MS1 sensor 304 and the MS2 sensor 306 on the focal plane of the sensor assembly 302 that includes both sensors, as can be appreciated from FIGS. 3A and 3B. The MS1 sensor 304 can be used to produce a first image of a portion of the surface of the earth, while the MS2 sensor 306 produces a second image of a portion of the surface of the Earth. Because of the physical separation between the sensors 304 and 306 at the focal plane of the sensor assembly 302, the first and second images (produced using the sensor arrays 304 and 306, respectively) will have slight offsets in the top, bottom, and sides of the images, as will be described in further detail with reference to FIGS. 4 and 5. Each image that is obtained by a sensor includes image data, which can include spectral data and metadata, but is not limited thereto. In another embodiment, the MS1 sensor 304 and the MS2 sensor 306 are whisk broom sensors. In other embodiments, other types of sensors can be used.

Figure 4:
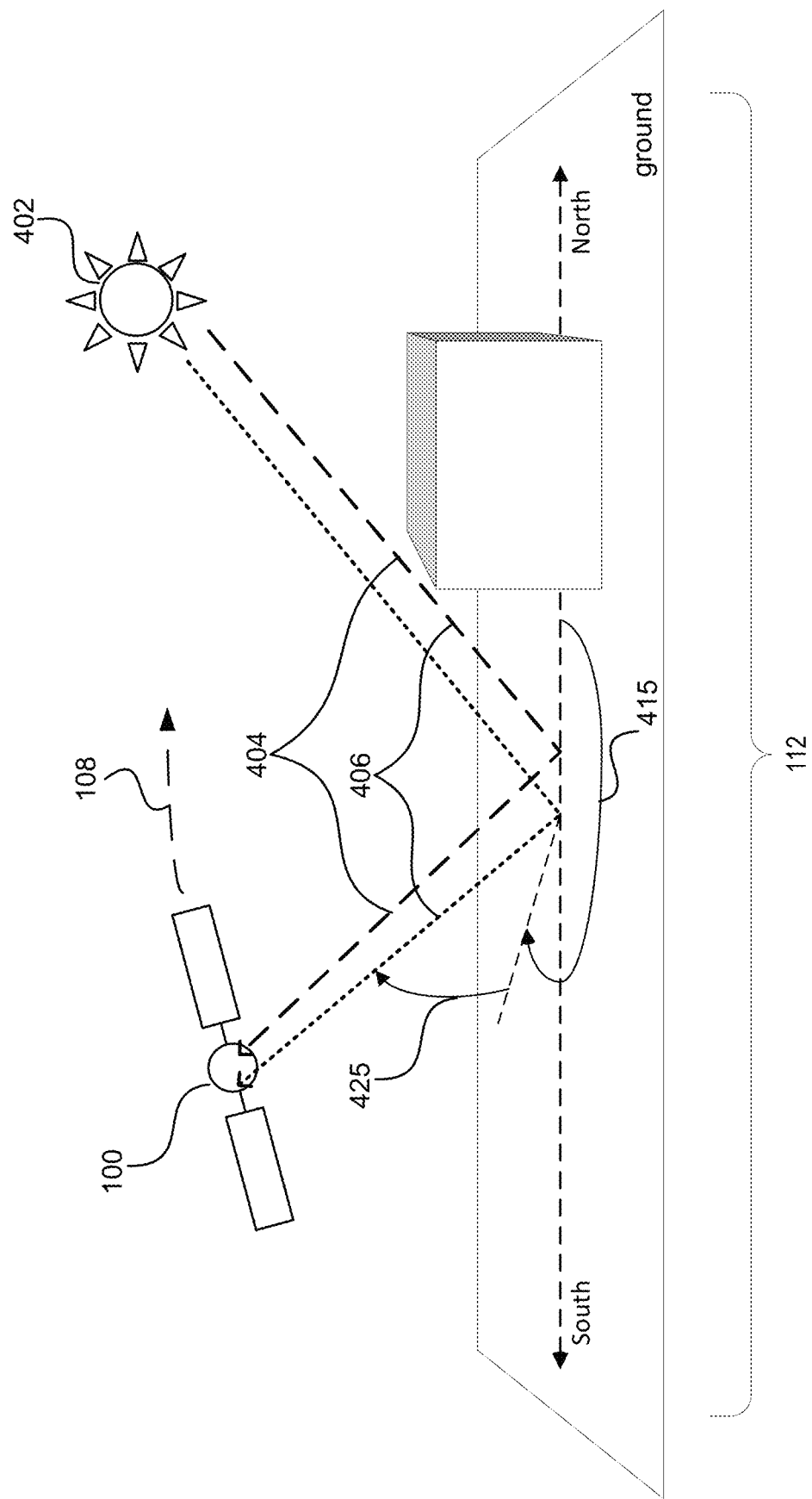
FIG. 4 depicts a satellite with two sensors.

Referring to FIG. 4, shown therein is the satellite 100 moving along the orbital path 108. FIG. 4 also shows that light emitted from the sun 402 is reflected off the surface of the Earth towards the satellite 100 such that first and second images of a portion of the surface of the Earth are captured by the MS1 and MS2 sensors, respectively. More specifically, the emitted and reflected light labeled 404 is imaged by the MS1 sensor 304 to produce the first image, and the emitted and reflected light labeled 406 is imaged by the MS2 sensor 306 to produce the second image. Explained another way, the MS1 sensor can be said to obtain first image data, and the MS2 sensor can be said to obtain second image data. FIG. 4 shows that at a given instant in time, the MS1 sensor array captures an image of a first location on Earth and the MS2 sensor array captures an image of a second location on Earth. Thus, for a particular location on Earth, the MS1 sensor array captures an image of the particular location on Earth at a first time and the MS2 sensor array captures an image of the same particular location on Earth at a second time that is after the first time. In other words, a single location depicted in a multispectral image from satellite 100 will have been sensed at different times by the MS1 sensor and the MS2 sensor.

In FIG. 4, each of emitted and reflected light 404 and 406 has a viewpoint direction relative to satellite 100. The viewpoint direction may be defined by an azimuth 415 and elevation 425. (Only the elevation and azimuth for light 406 is illustrated in FIG. 4.)

Figure 5:
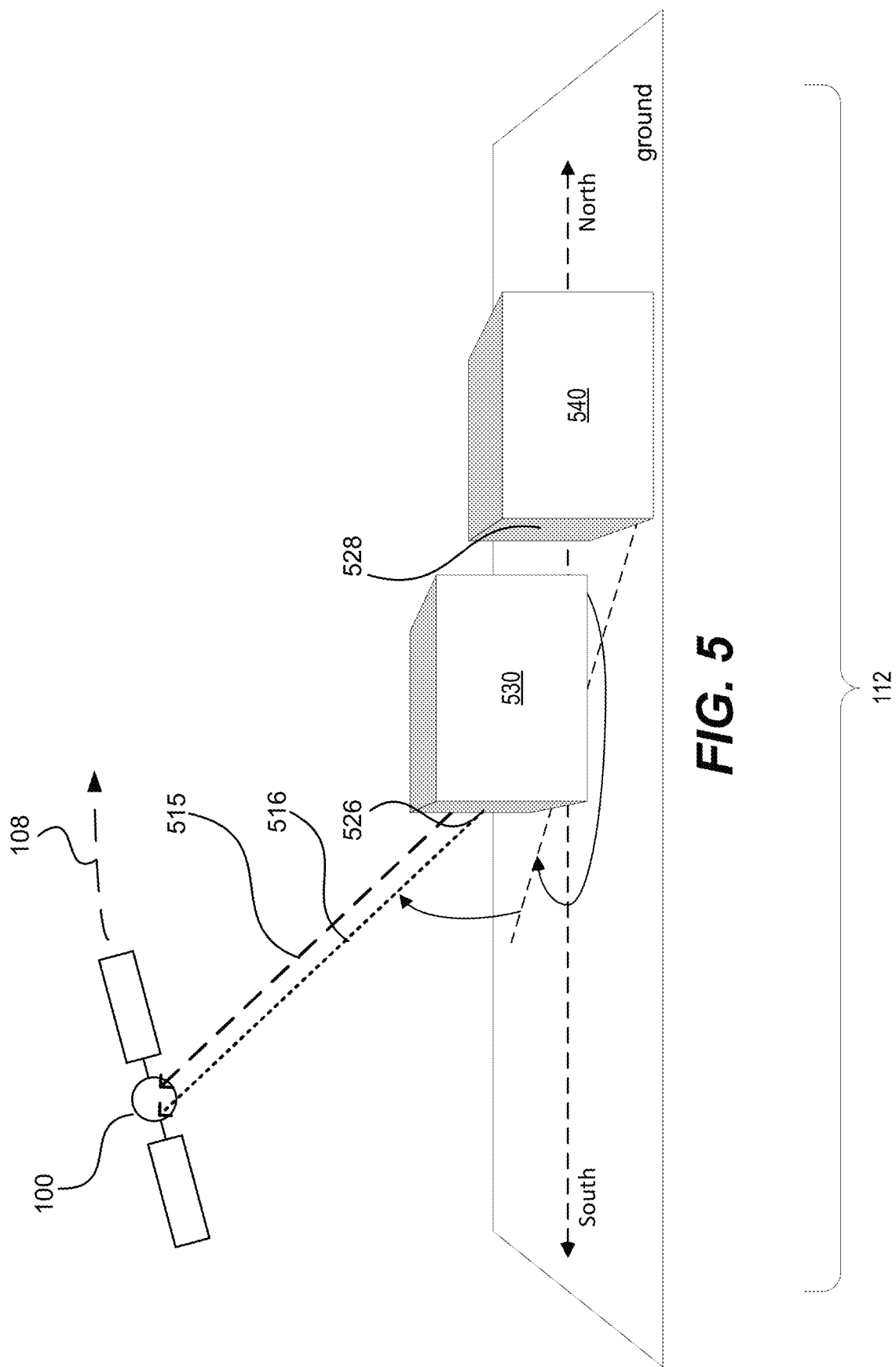
FIG. 5 depicts two bands of a composite image captured by a satellite (or other airborne craft) that is part of an image collection and distribution system that can implement various embodiments of the proposed technology.

FIG. 5 illustrates how a satellite image may capture one side of a building while other sides of other buildings in an image are occluded. FIG. 5 shows reflected light 515 and 516 which is reflected from a first side 526 of a building 530. Each of reflected light 515 and 516 has associated viewpoint direction, which may be defined as a viewpoint vector (having a direction that is the line of sight from the satellite to the building). Note that the azimuth of the viewpoint direction is such that building 540 lies fully or partially behind building 530, such that side 528 will be fully or partially occluded from an image taken along this viewpoint direction.

There may be some instances when the image sensors of FIG. 3 capture first and second images, which are slightly offset from one another. Such first and second sensors can be the MS1 sensor 304 and the MS2 sensor 306, discussed above, but are not limited thereto. Nevertheless, the first and second sensors are sufficiently close to one another and are moving at the same time as one another relative to the ground such that a majority of the first and second images will correspond to the same portion of the ground, just captured at slightly different times with slightly different satellite viewing angles. Associated with each of the first and second images is respective image data (e.g., pixels). For example, the first image information about the geographic region 125 can include B, G, R, and N1 band values for each pixel of N×M pixels, and the second image information about the geographic region 125 (can include C, Y, RE, and N2 band values for each pixel of N×M pixels.

As discussed above, in one embodiment the MS1 sensor 304 and the MS2 sensor 306 each capture image data for four bands. In one embodiment, satellite 100 also includes one or more additional sensors that sense an additional eight SWIR bands which are combined with the eight VNIR bands to form sixteen bands of a multispectral image.

Figure 6:
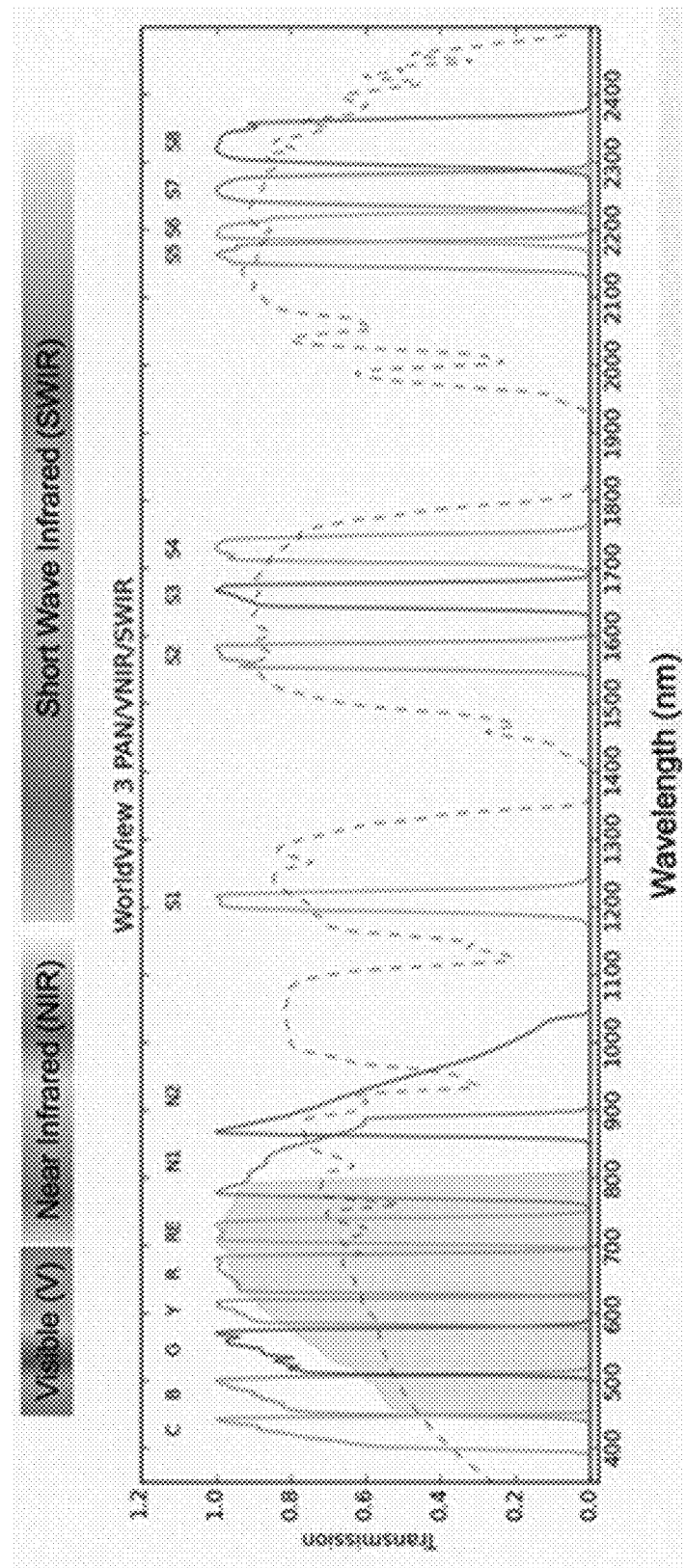
FIG. 6 defines the various bands of one embodiment of a satellite imaging system that is part of an image collection and distribution system that can implement various embodiments of the proposed technology.

FIG. 6 defines the sixteen bands for one embodiment of the satellite imaging system that is part of an image collection and distribution system that can be used to implement various embodiments of the present technology. Specifically, FIG. 6 depicts a coastal (C) band (400-450 nm), a blue (B) band (450-510 nm), a green (G) band (510-580 nm), a yellow (Y) band (585-625 nm), a red (R) band (630-690 nm), a red edge (RE) band (705-745 nm), a near-infrared 1 (N1) band (770-895 nm), a near-infrared 2 (N2) band (860-1040 nm), S1 band (1195-1225 nm), S2 (1550-1590 nm), S3 band (1640-1680 nm), S4 band (1710-1750 nm), S5 band (2145-2185 nm), S6 band (2185-2225 nm), S7 band (2235-2285 nm), and S8 band (2295-2365 nm). Other combinations and/or ranges of VNIR and SWIR bands generally from about 1195 nm to about 2400 nm may be provided in any combination.

Figure 7:
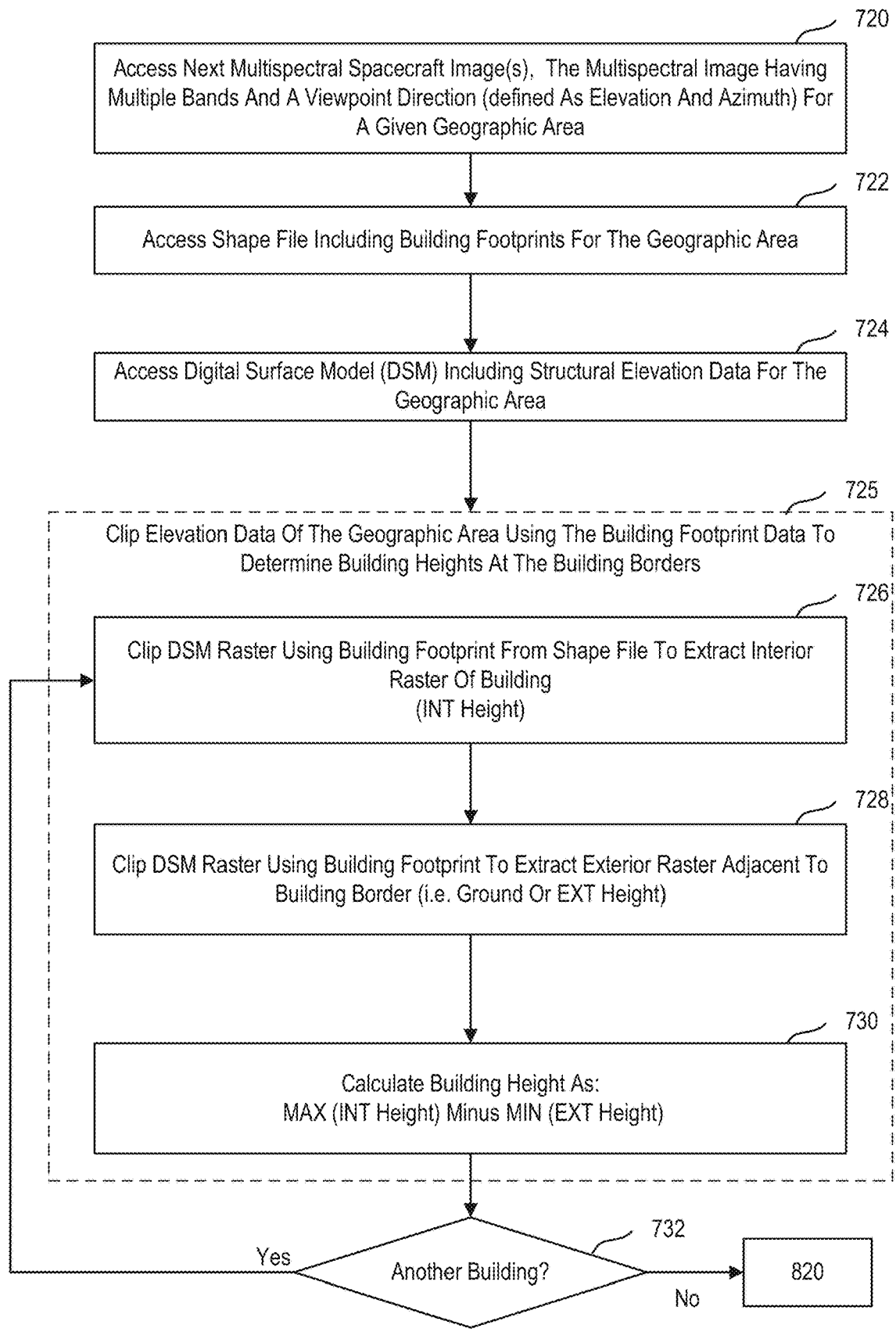
FIG. 7 is a flowchart illustrating a first portion of a method for identifying materials in geospatial imagery.

In one embodiment, the sensors described above sense image data in the sixteen bands of FIG. 6 which combine to form a composite image. This concept is depicted in FIG. 7 which illustrates the sixteen bands 704, 706, 708, 710, 712, 714, 716, 718, 720, 722, 724, 726, 728, 730, 732 and 734 that form the composite multispectral image. Each of the bands 704-734 can be referred to as a sub-image or an image as they do comprise image data within the respective range of wavelengths for a plurality of pixels. That is, in one embodiment, each band includes an array of pixels.

Figure 8:
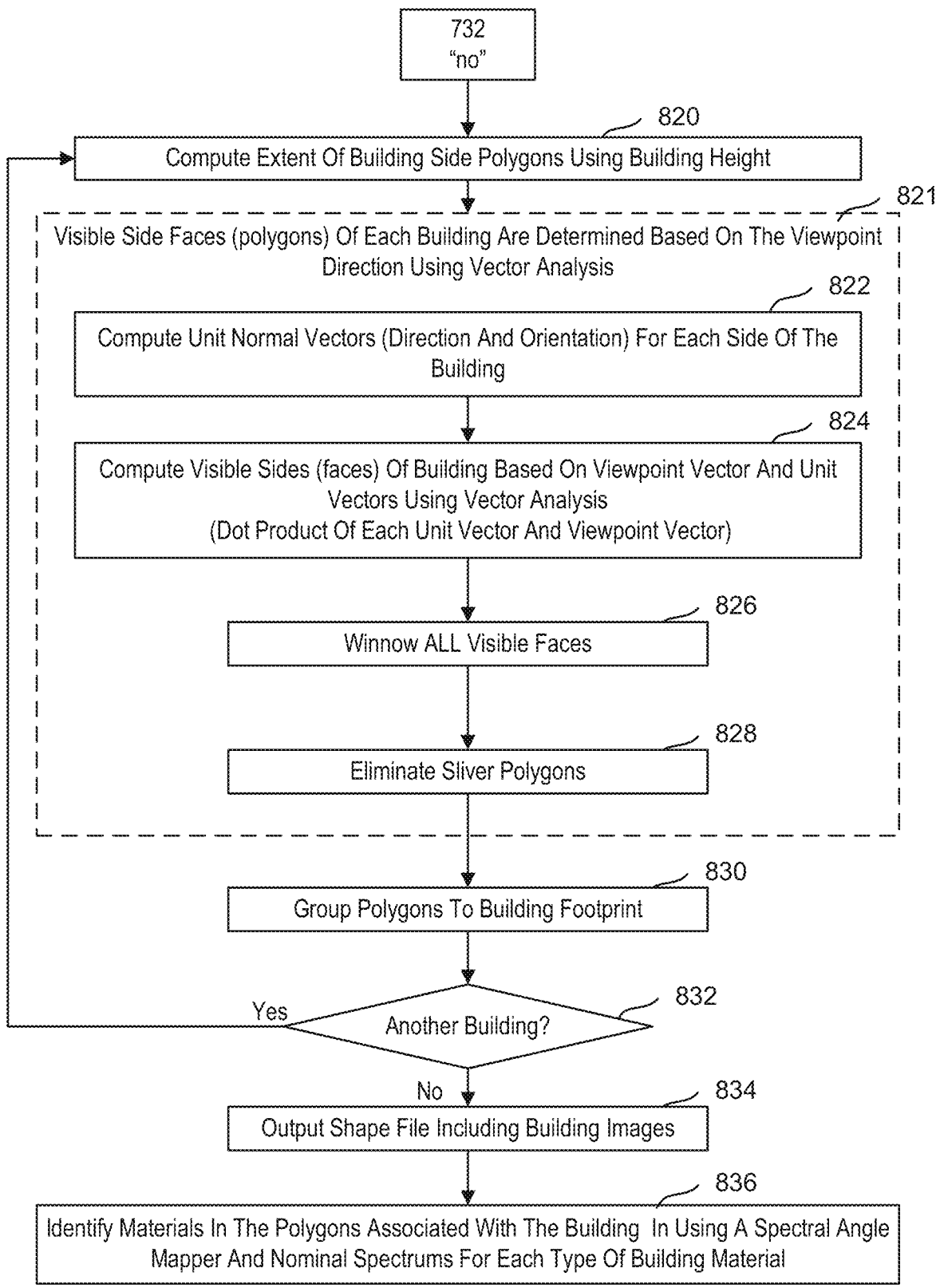
FIG. 8 is a flowchart illustrating a second portion of the method for identifying materials in geospatial imagery.

FIGS. 7 and 8 illustrate a method for identifying building materials from satellite imagery for a geographic area. In one embodiment, the method is an automated method performed automatically by a processing device, such as image processing system 236 or a separate processing system which accesses the multispectral images and the data described below with respect to the method. Initially, at 720, multispectral spacecraft images are accessed. The multispectral spacecraft images may be accessed by retrieving the images from a data file stored in data storage 238 (FIG. 2). As noted above, each of the multispectral images is associated with a geographic area and may have multiple spectral bands and a viewpoint direction of the geographic area associated therewith in the data file. At 722, building footprint data for the geographic area is accessed. In one implementation, this can be performed by accessing a shape file which includes the building footprint data for the geographic area. At 724, structural elevation data for the geographic area is accessed. In one implementation, this can be performed by accessing a digital surface model (DSM) including structural elevation data for the geographic area. A DSM for the geographic area includes elevation data for the geographic area which can be represented as a raster, in one embodiment. DSMs for the geographic areas of the earth are readily available from third-party creators.

At 725, elevation data of the geographic area is clipped using the building footprint data to determine building heights at the building borders. In one embodiment, this may comprise several sub-steps. At 726, the DSM raster is clipped using the building footprint data from the shape file to extract data on interior raster of the building, and in particular the building elevation data at the borders of the building. This results in an interior elevation (INT) value. At 728, the DSM raster is clipped using the building footprint data to extract exterior elevation values external to the building border, yielding external or ground elevation (EXT) data. (In an alternative embodiment, steps 726 and 728 may be reversed or performed simultaneously in a multithreaded processor.) At 730, the building height is calculated as the maximum internal elevation resulting from step 726 minus the minimum external elevation resulting from step 728. In other embodiments, other methods may be utilized to determine building height using elevation data of the geographic area.

At 732, the method loops to perform steps 725 for each building in the geographic area which is identified by the shape file data. When all buildings have been completed, the method moves step 820 shown in FIG. 8.

At 820, the extent of building side polygons is computed for each building. Each building side polygons arises from a translation of building footprint polygons along the line of sight to a distance determined by a function of building height and the specific elevation and azimuth of the line of sight (i.e. the view direction). At 821, for each building in a geographic area, visible side faces (polygons) of each building are determined based on the viewpoint direction using vector analysis. In one implementation, this may be implemented using several sub-steps. At 822, unit, normal vectors having a direction and orientation are computed for each side of a building in the geographic area. At 822, unit normal vectors are computed for all sides including those sides which may occluded from the image data based on the building footprint data which provides information on all sides. At 824, the visible sides of the building are computed based on the viewpoint vector and unit vectors using vector analysis to determine all visible faces. This computation takes the viewpoint vector defined by the viewpoint direction associated with each image and computes the dot product of the viewpoint vector with each of the unit vectors defined at step 822. A negative value dot product indicates a potentially relevant side polygon to the line of sight viewpoint vector (having direction from satellite to target). Those having a dot product greater than zero are facing away from the satellite. The result of step 824 is a set of candidate building side face polygons which may be visible in the image data. At step 826, all visible side face polygons in the candidate set are winnowed or further clipped by determining those faces or polygons which are not in the image based on the viewpoint vector. At 826, the centroid of each building is determined and faces along the view direction which are computed to be more distant in the view direction based on the building centroid are eliminated from the candidate set. At 828, sliver polygons remaining in the candidate set data are eliminated. Sliver polygons are those defined as being smaller than a particular pixel size threshold (such as one pixel wide, for example), or which have a view angle higher than a visible threshold. At 830, the remaining polygons are grouped and associated to each a building footprint of one of the buildings in the building footprint data for the geographic area. At 832, if another building remains, the method returns to step 820. Step 821 is repeated for all buildings in the building footprint data having visible side polygons. Once all buildings in the geographical area are completed, (step 832 is "no"), a shape file is output at 834. At 836, materials, and the polygons associated with particular building may be identifying using a spectral angle Mapper and nominal spectrums for each type of building material.

In step 836, the system identifies possible building material pixels in each grouped set of building image data in the shape file using a Spectral Angle Mapper and nominal spectrums for one or more types of building materials to find a match that identifies pixels that are associated with a particular building material. A Spectral Angle Mapper (SAM) is just one example process to identify similar spectra. Other spectral matching techniques includes (but are not limited to) Euclidean Distance Measure (ED), Spectral Correlation Angle (SCA), and Adaptive Coherence Estimator (ACE).

Figure 9:
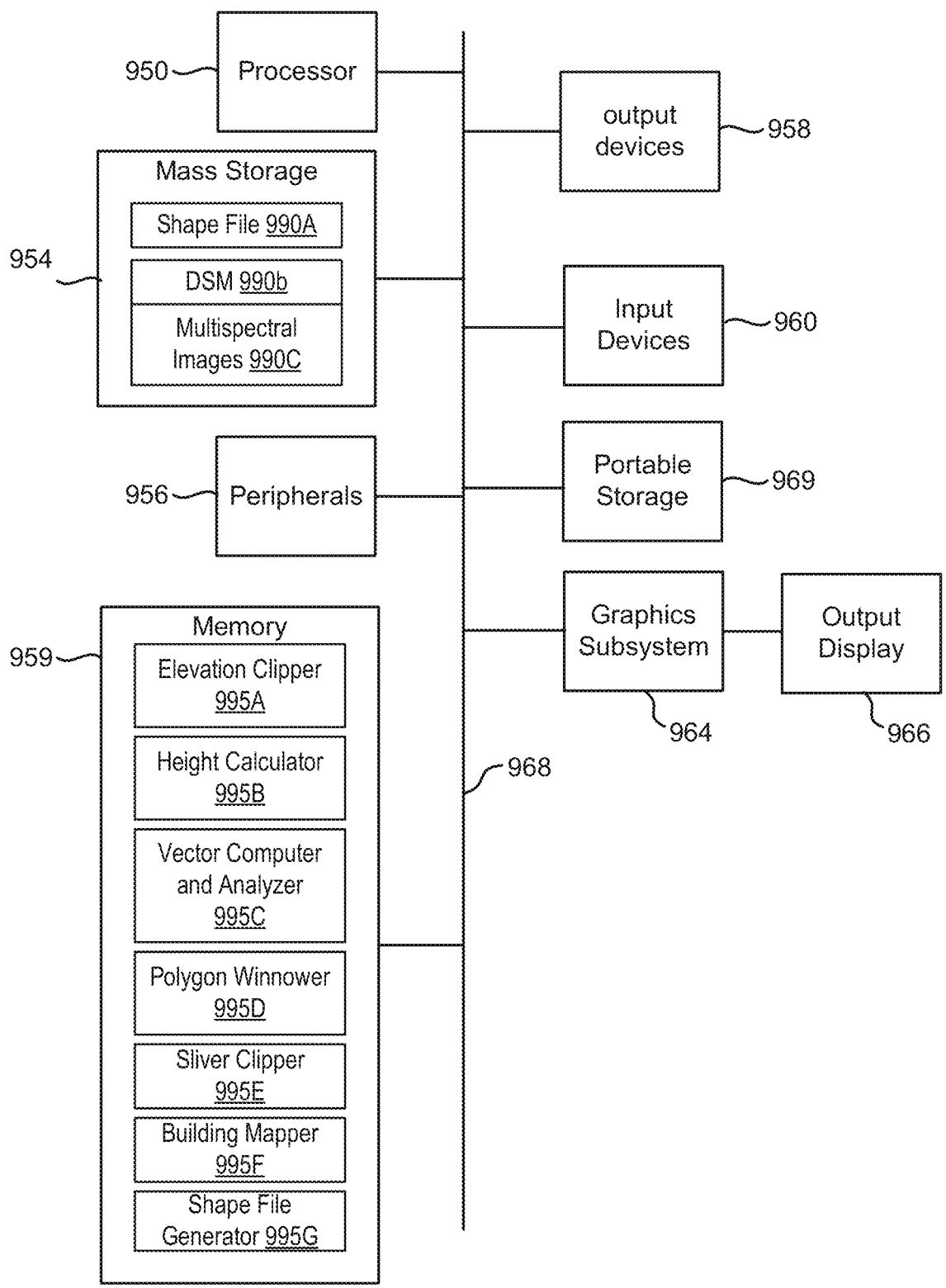
FIG. 9 depicts an example of a computing system that can perform the processes discussed herein. This computing system can be used to implement one or more of the components of an image collection and distribution system that can implement various embodiments of the proposed technology.

FIG. 9 is a block diagram of one example embodiment of a computing system that can be used to implement image processing system 236 and perform the processes discussed below for detecting materials in images from satellite 100. The computer system of FIG. 2 includes a processor 250 and main memory 252. Processor 250 may contain a single microprocessor or may contain a plurality of microprocessors for configuring the computer system as a multi-processor system. Main memory 252 stores, in part, instructions and data for execution by processor 250. In embodiments where the proposed technology is wholly or partially implemented in software, main memory 252 can store the executable code when in operation. Main memory 252 may include banks of dynamic random-access memory (DRAM) as well as high speed cache memory.

The system of FIG. 9 further includes a mass storage device 254, peripheral device(s) 226, user input device(s) 260, output devices 258, portable storage medium drive(s) 262, a graphics subsystem 264 and an output display 266. For purposes of simplicity, the components shown in FIG. 2A are depicted as being connected via a single bus 268. However, the components may be connected through one or more data transport means. For example, processor 250 and main memory 252 may be connected via a local microprocessor bus, and the mass storage device 254, peripheral device(s) 226, portable storage medium drive(s) 262, and graphics subsystem 264 may be connected via one or more input/output (I/O) buses. Mass storage device 254, which may be implemented with a magnetic disk drive or an optical disk drive or a solid state drive and is a non-volatile storage device for storing data and instructions for use by processor 250. In one embodiment, mass storage device 254 stores the system software for implementing the proposed technology for purposes of loading to main memory 252.

Portable storage medium drive 262 operates in conjunction with a portable non-volatile storage medium, such as a flash device, to input and output data and code to and from the computer system of FIG. 2A. In one embodiment, the system software for implementing the proposed technology is stored on such a portable medium, and is input to the computer system via the portable storage medium drive 262. Peripheral device(s) 226 may include any type of computer support device, such as an input/output (I/O) interface, to add additional functionality to the computer system. For example, peripheral device(s) 226 may include a network interface for connecting the computer system to a network, a modem, a router, etc.

User input device(s) 260 provides a portion of a user interface. User input device(s) 260 may include an alpha-numeric keypad for inputting alpha-numeric and other information, or a pointing device, such as a mouse, a trackball, stylus, or cursor direction keys. In order to display textual and graphical information, the computer system of FIG. 2A includes graphics subsystem 264 and output display 266 (e.g., a monitor). Graphics subsystem 264 receives textual and graphical information and processes the information for output to display 266. Additionally, the system of FIG. 2A includes output devices 258. Examples of suitable output devices include speakers, printers, network interfaces, monitors, etc.

As illustrated in FIG. 9 mass storage device 254 stores the system software for implementing the proposed technology for purposes of loading to main memory 252. In FIG. 9, the main memory 252 is illustrated as having a shape file 990a, DSM 990B and multispectral images, used as source data for performing the technology discussed herein. Mass storage device 254 may also executable code that in operation, comprises an elevation clipper 995A, a height calculator 995B, a vector computer and analyzer 995C, a polygon winnower 995D, a sliver polygon clipper 995E, polygon building mapper 995F, and a shape file generator 995G. The elevation clipper 995A may be operable to perform steps 726 and 728, discussed above. The height calculator 995B may be operable to perform step 730 discussed above. The vector computer and analyzer 995C may be operable to perform steps 882 and 884 discussed above. The polygon winnower 995D may be operable to perform step 826 discussed above. The sliver clipper 995E may be operable to perform step 828 discussed above. The polygon building mapper 995F may be operable to perform step 830 discussed above. shape file generator 995G may be operable to perform step 834 discussed above.

The above text describes a system for automatically identifying building materials in an image, and in particular a multispectral image captured by a satellite or other airborne craft. One general aspect includes an automated method for identifying a material in an image. The method includes accessing multispectral spacecraft images for a geographic area, each image having a viewpoint direction and accessing building footprint data and elevation data for the geographic area. The automated method also includes clipping the elevation data using the building footprint data to determine building heights at building borders. The automated method also includes determining polygons representing visible side faces of each building in the images based on the viewpoint direction using vector analysis. The automated method also includes attaching ones of the polygons to a building footprint of each building in the geographic area. The automated method also includes identifying materials in the polygons associated with each building.

Implementations of the automated method may comprise a method where accessing building footprint data and structural elevation data comprises retrieving building footprint data from a shape file and retrieving elevation data in a raster from a digital surface model. Implementations of the automated method may include a method where clipping the elevation data comprises: clipping the raster using the building footprint data to extract an interior area of each building to determine an interior elevation of each building; clipping the raster using the building footprint data to extract an exterior border of the building to determine a ground elevation; and calculating a building height of each building in the building footprint data as a maximum interior elevation of each building minus the ground elevation of each building. Implementations of the automated method may comprise clipping the elevation data for each building before determining polygons representing visible side faces of each building. Implementations of the automated method may comprise determining polygons representing visible side faces of each building by: computing unit normal vectors for each side of each building; calculating visible side polygons of each building based on the viewpoint direction using vector analysis; and computing a dot product of a vector defining the viewpoint direction and each unit normal vector, and where a non-zero dot product indicates a visible face. Implementations of the automated method may comprise winnowing all visible faces by determining an order of polygons along the view direction and clipping those polygons more distant in the view direction based on a centroid computed for each building. Implementations of the automated method may comprise eliminating sliver polygons by removing those polygons smaller than a dimensional threshold and having a view angle above a threshold. Implementations of the automated method may comprise identifying building materials using a spectral angle mapper and nominal spectrums for various types of building materials. Implementations of the described techniques may include hardware, a method or process, or computer software on a computer-accessible medium.

Another general aspect includes a computer implemented process of identifying a material in an image, including accessing multispectral spacecraft images, each image having a viewpoint direction, for a geographic area, and accessing a shape file having building footprint data for the geographic area. The computer implemented method also includes accessing a digital surface model having a raster of structural elevation data for the geographic area. The computer implemented method also includes clipping the structural elevation data using the building footprint data to determine building heights for each building in the geographic area. The computer implemented method also includes determining polygons representing visible side faces of each building in the images based on the viewpoint direction using vector analysis. The computer implemented method also includes for each visible side face in the geographic area, associating ones of the polygons to a building footprint of a building in the geographic area. The computer implemented method also includes identifying materials in the polygons associated with each building Implementations of the computer implemented method may comprise a method where clipping the structural elevation data includes clipping the raster using the building footprint data to determine an interior elevation of each building. Implementations of the computer implemented method may also include clipping the raster using the building footprint data to determine a ground elevation at a building border. Implementations of the computer implemented method may also include calculating a building height of each building in the building footprint data as the maximum of the interior elevation of said each building minus the ground elevation of said each building. Implementations of the computer implemented method may comprise a method where determining polygons representing visible side faces of each building includes computing unit normal vectors for each side of each building. Implementations of the computer implemented method may also include calculating visible side polygons of each building based on the viewpoint direction using vector analysis. Implementations of the computer implemented method may comprise a method where the vector analysis includes computing a dot product of a vector defining the viewpoint direction and each unit normal vector. Implementations of the computer implemented method may comprise a method further including winnowing all visible faces by determining an order of polygons along the view direction and clipping those polygons more distant in the view direction based on a centroid computed for each building prior to said identifying. Implementations of the computer implemented method may comprise a method further including eliminating sliver polygons by removing those polygons smaller than a dimensional threshold and having a view angle above a threshold prior to said identifying. Implementations of the computer implemented method may comprise a method where identifying building materials includes using a spectral angle mapper and nominal spectrums for various types of building materials. Implementations of the described techniques may include hardware, a method or process, or computer software on a computer-accessible medium.

Another aspect of the technology includes a non-transitory processor readable storage device having processor readable code embodied on the processor readable storage device, the processor readable code programming one or more processors to perform a method including accessing multispectral spacecraft images of a geographic area, each image having a viewpoint direction, accessing building footprint data including one or more building footprints for buildings in the geographic area from a shape file, and accessing a raster of structural elevation data for the geographic area from a digital surface model. The non-transitory processor readable storage device also includes processor readable code programming one or more processors to clip the structural elevation data using the building footprint data to determine building heights at building borders. The non-transitory processor readable storage device also includes processor readable code programming one or more processors to determining polygons representing visible side faces of each building in the images based on the viewpoint direction using vector analysis after clipping the structural elevation data for each building. The non-transitory processor readable storage device also includes processor readable code programming one or more processors to associate ones of the polygons to a building footprint of a building in the geographic area. The non-transitory processor readable storage device also includes processor readable code programming one or more processors to identify materials in the polygons associated with each building Implementations may include a non-transitory processor readable storage device where clipping the structural elevation data includes: clipping the raster using the building footprint data to determine an interior elevation of each building; clipping the raster using the building footprint data to determine a ground elevation at a building border; and calculating a building height of each building in the building footprint data as the maximum of the interior elevation of said each building minus the ground elevation of said each building. Implementations may include a non-transitory processor readable storage device where determining polygons representing visible side faces of each building includes: computing unit normal vectors for each side of each building; and calculating visible side polygons of each building based on the viewpoint direction by computing a dot product of a vector defining the viewpoint direction and each unit normal vector. Implementations may include a non-transitory processor readable storage device where the code further includes determining an order of polygons along the view direction and clipping those polygons more distant in the view direction based on a centroid computed for each building. Implementations may include a non-transitory processor readable storage device where the code includes eliminating sliver polygons by removing those polygons smaller than a dimensional threshold and having a view angle above a threshold prior to identifying. Implementations of the described techniques may include hardware, a method or process, or computer software on a computer-accessible medium.

Other embodiments of each of the above aspects may include corresponding computer systems, apparatus, and computer programs recorded on one or more computer storage devices, each configured to perform the actions of the methods.

For purposes of this document, it should be noted that the dimensions of the various features depicted in the figures may not necessarily be drawn to scale.

For purposes of this document, reference in the specification to "an embodiment," "one embodiment," "some embodiments," or "another embodiment" may be used to describe different embodiments or the same embodiment.

For purposes of this document, a connection may be a direct connection or an indirect connection (e.g., via one or more other parts). In some cases, when an element is referred to as being connected or coupled to another element, the element may be directly connected to the other element or indirectly connected to the other element via intervening elements. When an element is referred to as being directly connected to another element, then there are no intervening elements between the element and the other element. Two devices are "in communication" if they are directly or indirectly connected so that they can communicate electronic signals between them.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects.

For purposes of this document, the term "set" of objects may refer to a "set" of one or more of the objects.

The foregoing detailed description has been presented for purposes of illustration and description. It is not intended to be exhaustive or to limit the subject matter claimed herein to the precise form(s) disclosed. Many modifications and variations are possible in light of the above teachings. The described embodiments were chosen in order to best explain the principles of the disclosed technology and its practical application to thereby enable others skilled in the art to best utilize the technology in various embodiments and with various modifications as are suited to the particular use contemplated. It is intended that the scope of be defined by the claims appended hereto.

What is claimed is:

1. An automated method for identifying a material in an image, comprising:
    accessing multispectral spacecraft images for a geographic area, each image having a viewpoint direction;
    accessing building footprint data and elevation data for the geographic area;
    clipping the elevation data using the building footprint data to determine building heights;
    determining polygons representing visible side faces of each building in the images based on the viewpoint direction using vector analysis, including culling ones of the one or more polygons which are occluded in the image to provide one or more visible polygons;
    attaching ones of the one or more polygons representing visible side faces to a building footprint of a building in the geographic area; and
    identifying materials in the polygons associated with each building.

2. The method of claim 1 wherein accessing building footprint data and structural elevation data comprises retrieving building footprint data from a shape file and retrieving elevation data in a raster from a digital surface model.

3. The method of claim 2 wherein clipping the elevation data comprises:
    clipping the raster using the building footprint data to extract an interior area of each building to determine an interior elevation of each building;
    clipping the raster using the building footprint data to extract an exterior border of the building to determine a ground elevation; and
    calculating a building height of each building in the building footprint data as a maximum interior elevation of each building minus the ground elevation of each building.

4. The method of claim 1 wherein the clipping the elevation data is performed for each building before determining polygons representing visible side faces of each building.

5. The method of claim 1 wherein determining polygons representing visible side faces of each building comprises:
    computing unit normal vectors for each side of each building; and
    calculating visible side polygons of each building based on the viewpoint direction using vector analysis.

6. The method of claim 5 wherein the vector analysis comprises computing a dot product of a vector defining the viewpoint direction and each unit normal vector, and wherein a non-zero dot product indicates a visible face.

7. The method of claim 1 further including winnowing all visible faces by determining an order of polygons along the view direction and clipping those polygons more distant in the view direction based on a centroid computed for each building.

8. The method of claim 1 further including eliminating sliver polygons by removing those polygons smaller than a dimensional threshold and having a view angle above a threshold.

9. The method of claim 1 wherein the identifying comprises using a Spectral Angle Mapper and nominal spectrums for various types of building materials.

10. A computer implemented method of identifying a material in an image, comprising:
    accessing multispectral spacecraft images, each image having a viewpoint direction, for a geographic area;
    accessing a shape file having building footprint data for the geographic area;
    accessing a digital surface model having a raster of structural elevation data for the geographic area;
    clipping the structural elevation data using the building footprint data to determine building heights at building borders for each building in the geographic area;
    determining polygons representing visible side faces of each building in the images based on the viewpoint direction using vector analysis, including culling ones of the one or more polygons which are occluded in the image to provide one or more visible polygons;
    for each visible side faces in the geographic area, associating ones of the one or more polygons representing visible side faces to a building footprint of a building in the geographic area; and
    identifying materials in the polygons associated with each building.

11. The method of claim 10 wherein clipping the structural elevation data comprises:
    clipping the raster using the building footprint data to determine an interior elevation of each building;
    clipping the raster using the building footprint data to determine a ground elevation at a building border; and
    calculating a building height of each building in the building footprint data as the maximum of the interior elevation of said each building minus the ground elevation of said each building.

12. The method of claim 11 wherein determining polygons representing visible side faces of each building comprises:
    computing unit normal vectors for each side of each building; and
    calculating visible side polygons of each building based on the viewpoint direction using vector analysis.

13. The method of claim 12 wherein the vector analysis comprises computing a dot product of a vector defining the viewpoint direction and each unit normal vector such that each non-zero dot product represents a potentially visible polygon.

14. The method of claim 12 further including winnowing all visible faces by determining an order of polygons along the view direction and clipping those polygons more distant in the view direction based on a centroid computed for each building prior to said identifying.

15. The method of claim 14 further including eliminating sliver polygons by removing those polygons smaller than a dimensional threshold and having a view angle above a threshold prior to said identifying.

16. The method of claim 15 wherein the identifying comprises using a Spectral Angle Mapper and nominal spectrums for various types of building materials.

17. A non-transitory processor readable storage device having processor readable code embodied on the processor readable storage device, the processor readable code programming one or more processors to perform a method comprising:
- accessing multispectral spacecraft images of a geographic area, each image having a viewpoint direction;
- accessing building footprint data comprising one or more building footprints for buildings in the geographic area from a shape file;
- accessing a raster of structural elevation data for the geographic area from a digital surface model;
- for each building in the geographic area, clipping the structural elevation data using the building footprint data to determine building heights;
- after clipping the structural elevation data for each building, determining polygons representing visible side faces of each building in the images based on the viewpoint direction using vector analysis, including culling ones of the one or more polygons which are occluded in the image to provide one or more visible polygons;
- for each visible side faces in the geographic area, associating ones of the one or more visible polygons to a building footprint of a building in the geographic area; and
- identifying materials in the polygons associated with each building.

18. The non-transitory processor readable storage device of claim 17 wherein clipping the structural elevation data comprises:
- clipping the raster using the building footprint data to determine an interior elevation of each building;
- clipping the raster using the building footprint data to determine a ground elevation at a building border; and
- calculating a building height of each building in the building footprint data as the maximum of the interior elevation of said each building minus the ground elevation of said each building.

19. The non-transitory processor readable storage device of claim 18 wherein determining polygons representing visible side faces of each building comprises:
- computing unit normal vectors for each side of each building; and
- calculating visible side polygons of each building based on the viewpoint direction by computing a dot product of a vector defining the viewpoint direction and each unit normal vector.

20. The non-transitory processor readable storage device of claim 19 further including:
- determining an order of polygons along the view direction and clipping those polygons more distant in the view direction based on a centroid computed for each building; and
- eliminating sliver polygons by removing those polygons smaller than a dimensional threshold and having a view angle above a threshold prior to identifying.

\* \* \* \* \*